US009584445B2

(12) United States Patent
Stubberfield et al.

(10) Patent No.: US 9,584,445 B2
(45) Date of Patent: Feb. 28, 2017

(54) DIRECT CONNECT VIRTUAL PRIVATE INTERFACE FOR A ONE TO MANY CONNECTION WITH MULTIPLE VIRTUAL PRIVATE CLOUDS

(71) Applicant: Equinix, Inc., Redwood City, CA (US)

(72) Inventors: Andre Stubberfield, Chicago, IL (US); Fabrice Albert, Los Gatos, CA (US); Sougata Maitra, Fairfax, VA (US)

(73) Assignee: Equinix, Inc., Redwood City, CA (US)

( * ) Notice: Subject to any disclaimer, the term of this patent is extended or adjusted under 35 U.S.C. 154(b) by 387 days.

(21) Appl. No.: 14/270,667

(22) Filed: May 6, 2014

(65) Prior Publication Data

US 2014/0334495 A1 Nov. 13, 2014

Related U.S. Application Data

(60) Provisional application No. 61/820,368, filed on May 7, 2013.

(51) Int. Cl.
| | |
|---|---|
| H04L 12/00 | (2006.01) |
| H04L 12/931 | (2013.01) |
| G06F 9/50 | (2006.01) |
| H04L 12/24 | (2006.01) |

(52) U.S. Cl.
CPC .......... *H04L 49/354* (2013.01); *G06F 9/5072* (2013.01); *H04L 41/5041* (2013.01)

(58) Field of Classification Search
None
See application file for complete search history.

(56) References Cited

U.S. PATENT DOCUMENTS

| | | |
|---|---|---|
| 6,515,224 B1 | 2/2003 | Pedro |
| 6,971,029 B1 | 11/2005 | Avery, IV et al. |
| 6,976,269 B1 | 12/2005 | Avery et al. |

(Continued)

FOREIGN PATENT DOCUMENTS

WO 2012075448 A1 6/2012

OTHER PUBLICATIONS

"Welcome—AWS Direct Connect", Jan. 16, 2013 (accessed on May 20, 2016 from https://web.archive.org/web/20130116032328/http://docs.aws.amazon.com/directconnect/latest/UserGuide/Welcome.html), 2 pp.

(Continued)

*Primary Examiner* — Robert C Scheibel
*Assistant Examiner* — Gautam Sharma
(74) *Attorney, Agent, or Firm* — Shumaker & Sieffert, P.A.

(57) ABSTRACT

Systems and methods include a direct connect virtual private interface includes a physical port configured to receive one physical connection in order to provide two or more virtual connections for multiple virtual private clouds (VPCs) within a public cloud provider's infrastructure. Each public cloud infrastructure has its own multiple VPCs. Each VPC is an on demand configurable pool of shared computing resources allocated within each public cloud provider's infrastructure that provides a certain level of isolation via an access control mechanism between different organizations using the pool of shared computing resources of that VPC's public cloud infrastructure. The direct connect virtual private interface is configured to provision a virtual circuit from the one physical connection between the public cloud infrastructure for each VPC within each public cloud provider's infrastructure.

20 Claims, 4 Drawing Sheets

(56) References Cited

U.S. PATENT DOCUMENTS

| | | |
|---|---|---|
| 7,577,154 B1 | 8/2009 | Yung et al. |
| 7,602,726 B1 | 10/2009 | Sundaresan et al. |
| 7,937,438 B1 | 5/2011 | Miller et al. |
| 8,213,460 B1 | 7/2012 | Buckland |
| 8,379,656 B2 | 2/2013 | Waldrop et al. |
| 8,509,249 B2 | 8/2013 | Waldrop et al. |
| 8,537,845 B2 | 9/2013 | Waldrop et al. |
| 8,583,503 B2 | 11/2013 | Waldrop et al. |
| 8,645,568 B2 | 2/2014 | Patterson et al. |
| 8,650,805 B1 | 2/2014 | Poleshuk et al. |
| 8,751,323 B2 | 6/2014 | Waldrop et al. |
| 8,756,344 B2 | 6/2014 | Waldrop et al. |
| 2003/0191841 A1 | 10/2003 | Deferranti et al. |
| 2011/0058565 A1 | 3/2011 | Waldrop et al. |
| 2011/0060657 A1 | 3/2011 | Waldrop et al. |
| 2011/0060846 A1 | 3/2011 | Waldrop et al. |
| 2011/0113798 A1 | 5/2011 | Pichai |
| 2011/0145292 A1 | 6/2011 | Lillie et al. |
| 2011/0145399 A1 | 6/2011 | Jeyapaul et al. |
| 2011/0145903 A1 | 6/2011 | Lillie et al. |
| 2011/0320598 A1 | 12/2011 | Solin |
| 2012/0084847 A1 | 4/2012 | Balasubramanian et al. |
| 2012/0102154 A1 | 4/2012 | Huang et al. |
| 2012/0110055 A1 | 5/2012 | Van Biljon et al. |
| 2012/0233668 A1 | 9/2012 | Leafe et al. |
| 2012/0297066 A1 | 11/2012 | Hewett |
| 2013/0110993 A1 | 5/2013 | Liu et al. |

OTHER PUBLICATIONS

Response to Communication pursuant to Rules 161(1) and 162 EPC dated Dec. 15, 2015, from counterpart European Patent Application 14795328.5, filed on Jun. 24, 2016, 7 pp.

Mudigonda, Jayaram. "Netlord: A Scalable Multi-Tenant Network Architecture for Virtualized Datacenters", Copyright 2011 ACM 978-1-4503-0797-0/11/08 retrieved from Internet URL:http://conferences.siacomm.org/sigcomm/2011/papers/sigcomm/p62.pdf 12 pages.

International Search Report and Written Opinion for International Patent Application No. PCT/US2014/037136, mailed Sep. 23, 2014, 10 pages. International Searching Authority, Alexandria, Virginia, USA.

Extended Search Report from counterpart European Application No. 14795328.5, dated Nov. 30, 2016, 8 pp.

DIRECT CONNECT VIRTUAL PRIVATE INTERFACE FOR A ONE TO MANY CONNECTION WITH MULTIPLE VIRTUAL PRIVATE CLOUDS

RELATED APPLICATION

This application claims priority benefit of US provisional patent application titled "DIRECT CONNECT VIRTUAL PRIVATE INTERFACE FOR A ONE TO MANY CONNECTION WITH MULTIPLE VIRTUAL PRIVATE CLOUDS" Ser. No. 61/820,368, filed May 7, 2013, which is incorporated in its entirety into this application.

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to communication networks including Ethernet networks.

BACKGROUND OF THE INVENTION

Private carriers generally create their own private networks and this can become very expensive if they need to lay new lines all over the world. Cloud computing allows organizations to create their own cloud.

SUMMARY

Embodiments described herein are used to create a single physical connection between a public cloud infrastructure and a multiple tenant datacenter in order to provision a virtual circuit for each Virtual Private Cloud within the public cloud infrastructure, via a direct connect private virtual interface. The Direct Connect Virtual Private Interface provides a facility to connect customers, carriers, and cloud providers together by leveraging these ideas and an Ethernet Exchange, such as Equinix' Ethernet Exchange. The Direct Connect Virtual Private Interface and associated system was designed with multi-tenancy in mind. The Direct Connect Virtual Private Interface and associated system will allow a service provider to extend cloud services to its clients at significant savings, since only one physical connection to a cloud service provider is required in order to deliver services to multiple clients this concept will make advance general adoption of Virtual Private Clouds. The Direct Connect Virtual Private Interface and associated system offers similar savings to enterprise clients also.

Systems and methods include a direct connect virtual private interface includes a physical port configured to receive one physical connection in order to provide two or more virtual connections for multiple virtual private clouds (VPCs) within a public cloud provider's infrastructure. Each public cloud infrastructure has its own multiple VPCs. Each VPC is an on demand configurable pool of shared computing resources allocated within each public cloud provider's infrastructure that provides a certain level of isolation via an access control mechanism between different organizations using the pool of shared computing resources of that VPC's public cloud infrastructure. The direct connect virtual private interface is configured to provision a virtual circuit from the one physical connection between the public cloud infrastructure for each VPC within each public cloud provider's infrastructure.

BRIEF DESCRIPTION OF THE DRAWINGS

The multiple drawings refer to the embodiments of the invention.

Figure 1A:
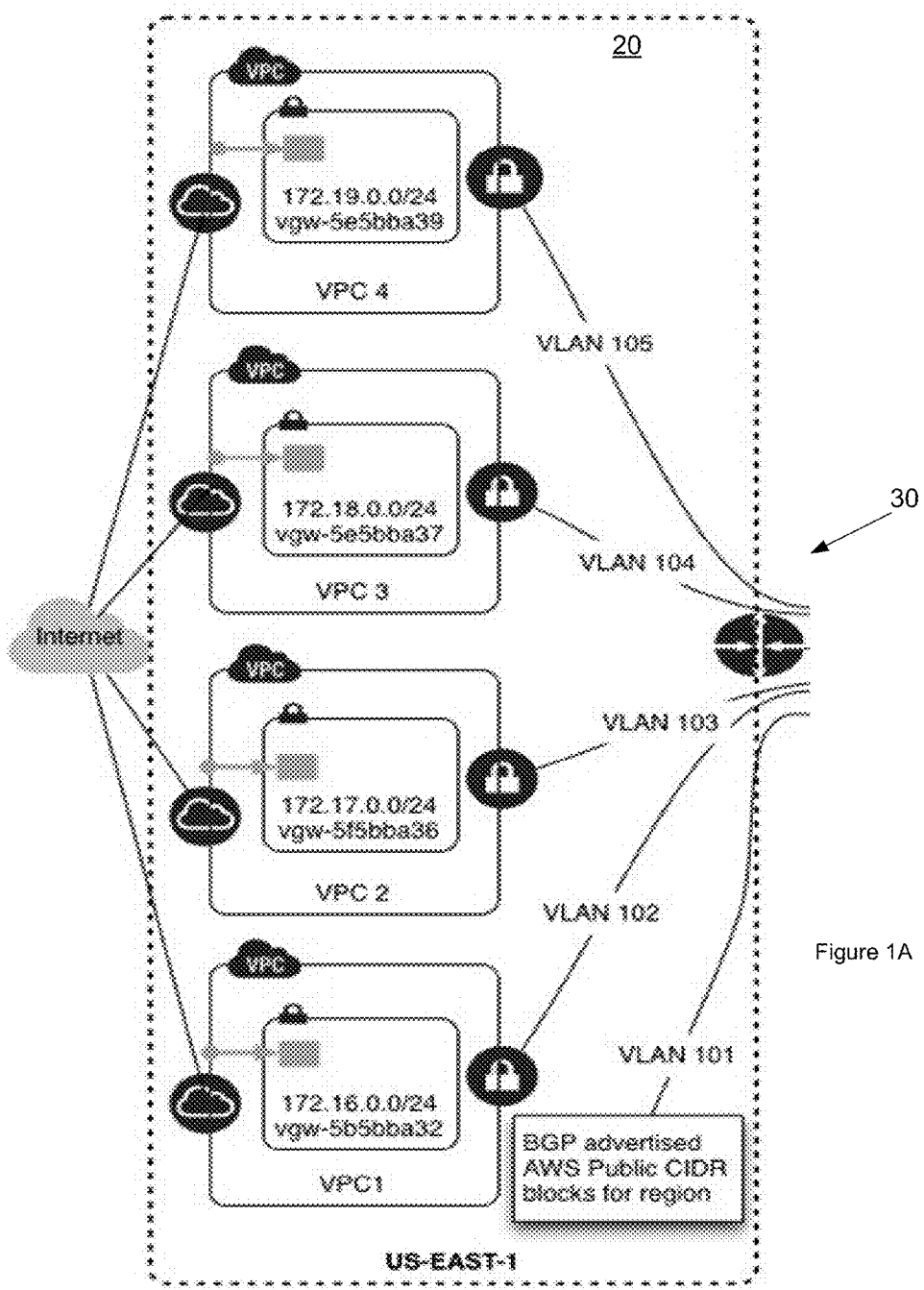
FIG. 1A illustrates an exemplary public cloud provider's infrastructure to be directly connected to a virtual private interface according to embodiments described herein.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of carrier lines, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first private carrier, may be made. However, the specific numeric reference should not be interpreted as a literal sequential order but rather interpreted that the first private carrier is different than a second private carrier. Thus, the specific details set forth are merely exemplary. The specific details may be varied from and still be contemplated to be within the spirit and scope of the present invention.

In general, an example process of and apparatus to provide a direct connect virtual private interface for a one to many (two or more) connections with multiple virtual private clouds and associated systems is described. The drawings and text describe various example implementations of the design.

Figure 1B:
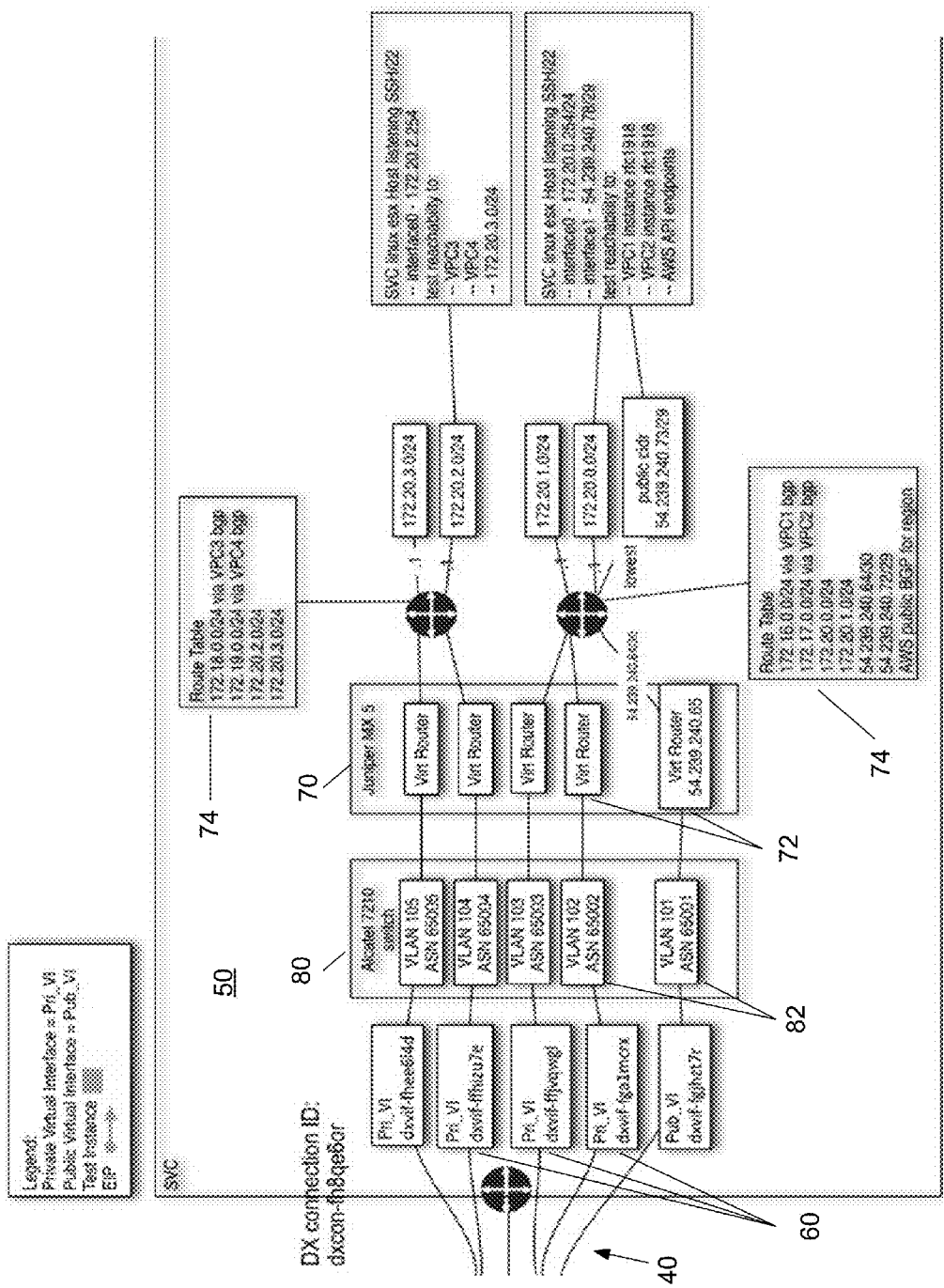
FIG. 1B illustrates an exemplary direct connect virtual private interface having at least one physical port to directly couple to the public cloud provider's infrastructure.
Figure 2:
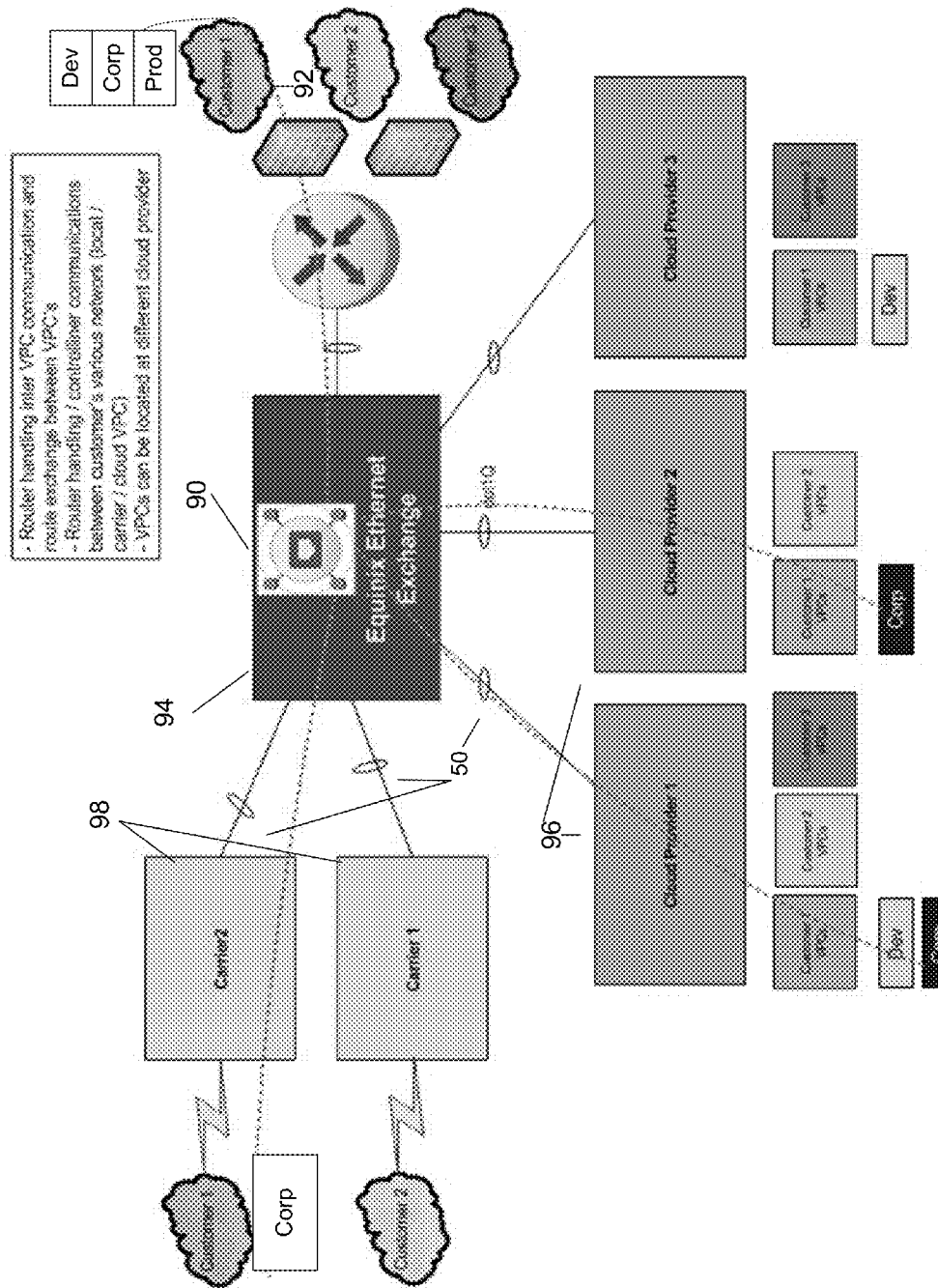
FIG. 2 illustrates an exemplary Ethernet exchange that is used to aggregate the connectivity between customer's cloud connectivity and carriers.

Referring to FIGS. 1-2, the direct connect virtual private interface cooperates with a number of components including two or more virtual routers, such as Juniper's MX5, two or more Service Access Switches such as Alcatel 7210 switches, to establish VLANs to create virtual routing tunnels between each virtual private cloud and the direct connect virtual private interface. Each virtual private cloud has its own port into the direct connect virtual private interface. The two or more virtual routers use a route table to allow connectivity/communication for the traffic within each virtual private cloud in this one to many connection set up. Note, this same type of service can be delivered to a carrier or enterprise using Cisco routers and the concept of virtual routing forwarding (VRF).

A direct connect virtual private interface may therefore include a physical port configured to receive one physical connection in order to provide two or more virtual connections for multiple virtual private clouds. Each public cloud infrastructure may have its own multiple virtual private clouds (VPCs), where each VPC is an on demand configurable pool of shared computing resources allocated within the given public cloud infrastructure. The multiple virtual private clouds may provide a certain level of isolation via an access control mechanism between different organizations using the pool of shared computing resources of that VPC's public cloud infrastructure. A certain level of isolation is understood to create a determined level of isolation between the different organizations using the shared computing resources. The determined level of isolation may be complete isolation or some subset of segregation that is set or controlled by the system through one or more of the configurations described herein. The direct connect virtual private interface may also be configured to provision a virtual circuit from the one physical connection between the public cloud infrastructure for each virtual private cloud within each public cloud provider's infrastructure.

FIG. 1A illustrates the public cloud provider's infrastructure 20 to be directly connected to a virtual private interface according to embodiments described herein. Each public cloud provider's infrastructure 20, one exemplary infrastructure illustrated as US-EAST-1, has one or more virtual private clouds (VPC) such as multiple virtual private clouds, VPC 1, VPC 2, VPC 3, VPC 4.

FIG. 1B illustrates an exemplary direct connect virtual private interface 50 having at least one physical port 40 to directly couple to the public cloud provider's infrastructure 20. The exemplary direct connect virtual private interface is configured with a plurality of private virtual interfaces (Pri_VI), 60 across the one physical connection 40. The direct connect virtual private interface incorporates a number of components to provision the private virtual interfaces. For example, the components may include one or more hardware routers 70 configurable to implement two or more virtual routers 72 as well as virtual routing forwarding (VRF) and one or more Service Access Switches 80 configurable to establish a virtual local area networks (VLAN) 82, VLAN 102-105, to create virtual routing tunnels between each virtual private cloud, VPC 1-VPC 4, and the direct connect virtual private interface 50.

The direct connect virtual private interface may have a plurality of physical ports for multiple public cloud provider's infrastructures to physically connect to the direct connect virtual private interface as well as two or more private ethernet lines to connect to the direct connect virtual private interface.

Thus, each VPC can have its own private virtual interface 60 into the direct connect virtual private interface 50. Multiple virtual routers may be set up or simulated by software running on one or more physical hardware routers that can be added, removed, moved, to scale up or down the system on demand.

The multiple virtual routers 72 may use one or more route tables 74. The multiple virtual routers handle inter virtual private cloud communication as well as external exchange of communication of traffic between the multiple VPCs using the route tables. No mixing of routes within the same route table occurs, such that each route within a given route table is unique. However, overlap between the same routes may exist between the route tables of each virtual router and thus in different route tables.

In an exemplary embodiment, the multiple virtual routers use their own route table, which can contain one or more imported/exported routes from other route tables to allow connectivity/communication for the traffic within each virtual private cloud in the exemplary one to many connection set up established through the direct connect virtual private interface. The virtual routers may act as independent entities inside each route table, i.e. each route within a table is unique but may overlap between virtual router tables. The direct connect virtual private interface may then also be configured to cooperate to allow for overlapping network VLANs between public cloud providers, organizations, and telecommunications carriers.

Embodiments described herein may be used in creating a single physical connection between a public cloud infrastructure and a multiple tenant datacenter in order to provision a virtual circuit for each Virtual Private Cloud within the public cloud infrastructure, via a direct connect private virtual interface. Each VPC may have its own port (private virtual interface (Pri_VI) into the direct connect virtual private interface. Each organization having a virtual private cloud then may have a client device resident within the multiple tenant datacenter. The direct connect virtual private interface establishes the virtual circuit between the VPC in the public cloud and the client device.

As illustrated in FIG. 2, the Ethernet exchange 94 is used to aggregate the connectivity between customer's cloud connectivity and carriers. The router 90 is allowing the customer 92 to enable and control access between all of the customer's networks in various locations. The use of virtual router and the Ethernet exchanger allows for overlapping networks subnet/VLANs between cloud providers 96/customers 92 and carriers 98. Thus, isolation can be achieved between one customer/organization using a first VPC and all other customers/organizations using the same virtual private cloud by allocating a Private IP Subnet and a virtual communication construct (such as a VLAN or a set of encrypted communication channels) per organization.

In an exemplary embodiment, data communications and control communications may be separated on different networks. For example, a second router may be configured to handle control communications between each local network of an organization using one of the VPC and the organization's telecommunications carrier connecting to the direct connect virtual private interface. This second router may handle the control communications of the organization as well as enable and control access between all of the organization's local networks in various public cloud provider infrastructures.

The advanced Cloud connectivity gives the ability to provide segregation/isolation of client information into private Virtual Private Clouds on a Web Services platform, such as Amazon's Web Services, while utilizing a single AWS direct connection for transport. Note, this same concept is not limited to Amazon only, it can be utilized to connect to other example Cloud Services providers. Google, Amazon, Salesforce, and Microsoft Azure are some well-known exemplary public cloud infrastructures/cloud providers.

In an exemplary embodiment, a Virtual Private Cloud (VPC) may be a private cloud existing within a shared or public cloud services platform (i.e. the Intercloud). The VPC is an on demand configurable pool of shared computing resources in a public cloud, isolated between the tenants of the public cloud. The isolation between tenants of a public cloud is performed via an access control mechanism. With the introduction of isolation levels, the provider's multi-tenant architecture is transformed to a single-tenant architecture. Thus, one or more telecommunications carriers can connect to the direct connect virtual private interface. A public cloud infrastructure may also have multiple organizations using the shared computing resources within that public cloud infrastructure. Each organization may have their own portion of the pool of shared computing resources forming a VPC for that organization, which is isolated from the other organizations using the shared computing resources within the same public cloud infrastructure.

For example, Amazon Web Services uses Amazon Virtual Private Cloud, which allows the Amazon Elastic Compute Cloud service to be connected to legacy infrastructures over an IPsec virtual private network connection. In Amazon Web Services (AWS), VPC is free to use, however users will be charged for any Virtual Private Networks (VPN) they use. Cloud computing is the use of computing resources (hardware and software) that are delivered as a service over a network (typically the Internet). For example, email may be a service provided over the network. Cloud computing uses the concept of converged infrastructure and shared services. Cloud computing entrusts remote services with a user's data, software and computation. End users access cloud-based applications through a web browser or a light-weight desktop or mobile app while the business software and user's data are stored on servers at a remote location. The direct connect virtual private interface allows an easy way to maximize those cloud computing resources.

The direct connect virtual private interface is configured to require only one physical connection to connect with a public cloud provider's infrastructure in order to create multiple virtual connections with corresponding virtual private interfaces in the direct connect virtual private interface in order to deliver services to multiple organizations, each with their own VPC within that public cloud provider's infrastructure. Each VPC may use a small byte sized capacity of the pool of shared computing resources allocated within the given public cloud infrastructure.

Using software as a service (SaaS), users can be provided access to application software and databases. Cloud providers manage the infrastructure and platforms that run the applications. SaaS is sometimes referred to as "on-demand software" and is usually priced on a pay-per-use basis. For cloud infrastructure services (SaaS), the public cloud provider providing the public cloud infrastructure, and the company realizing the VPC service over the public cloud provider's infrastructure, may be different.

Cloud providers provide the hardware, software, and personnel expenses to install and maintain these components to support the cloud. SaaS stores the users' data on the cloud provider's server. Cloud computing relies on sharing of resources to achieve coherence and economies of scale similar to a utility (like the electricity grid) over a network.

A switched virtual circuit (SVC) may be a temporary virtual circuit that is established and maintained only for the duration of a data transfer session. The direct connect virtual private interface is configured to use switched virtual circuits (SVCS) to form a virtual connection. Traffic may be delivered by a mechanism of packet mode communication such that after a connection via a virtual circuit is established between two nodes or application processes, a bit stream or byte stream may be delivered between the nodes. A virtual circuit protocol allows higher level protocols to avoid dealing with the division of data into segments, packets, or frames, where the SVC is a temporary connection that is established and maintained only for the duration of a data transfer session.

A Service Access Switch may allow a telecommunications carrier service that provides a two-point communications path to a customer's facilities from an end user's premises. The Service Access Switch may provide Ethernet demarcation, access, and aggregation devices to deliver high-value, MPLS-enabled Carrier Ethernet in support of business networking services.

The Direct Connect Virtual Private Interface and associated system satisfies a need for a multi-tenant cloud access strategy. A service provider or enterprise could use a single physical connection to the Cloud Service Provider's network over which multiple service provider clients or cloud provider clients could gain access to their own public and only their own cloud infrastructure. Thus, the Cloud provider's existing security setup is maintained.

The Direct Connect Virtual Private Interface and associated system provides a low latency, flexible, reliable platform that allows customers to have an enhanced level of control of their access into their VPCs.

The Direct Connect Virtual Private Interface and associated system can be created with multiple approaches to solving the client's needs. For example, the Direct Connect Virtual Private Interface and associated system may use Cisco equipment and VRFs. Also, for example, the Direct Connect Virtual Private Interface and associated system may use Juniper/Alcatel infrastructure and virtual routers to solve the problem. The Direct Connect Virtual Private Interface allows a Cloud provider to provide a multi-tenancy service delivery.

The Ethernet Exchange allows for a great flexibility in customer connectivity and transparency (VLAN tagging). The technology greatly enhances the capability that customers have to connect to Cloud providers by providing a way to control communications. The Ethernet Exchange allows for direct connectivity to Cloud Providers.

The Direct Connect Virtual Private Interface is attractive to carriers and customers.

Ecosystem factor where the Direct Connect Virtual Private Interface provides the facility to connect customers/carriers and cloud providers together leveraging these ideas and the Ethernet Exchange, such as Equinix' Ethernet Exchange. The Direct Connect Virtual Private Interface and associated system was designed with multi-tenancy in mind. The Direct Connect Virtual Private Interface and associated system will allow a service provider to extend cloud services to its clients at significant savings. Since only physical connection to a cloud service provider is required to deliver services to multiple clients. The Direct Connect Virtual Private Interface and associated system offers similar savings to enterprise clients also.

An organization may use a single physical connection to the public cloud provider's infrastructure. However, over the single physical connection to the public cloud provider's infrastructure, multiple service provider clients gain access to their own VPC and only their own VPC. The public cloud provider's infrastructure security setup is therefore maintained, because all virtualization is unique for each of the multiple service provider clients so that traffic from different multiple service provider clients is not commingled.

The Direct Connect Virtual Private Interface and associated system provides significant cost savings for customers and carriers including: connectivity costs; automated provisioning; rapid time to market; competitive pricing due to variety of options for customers; reliability of a managed platform; ease of access to multiple services; low latency due to proximity; and other similar advantages.

The Direct Connect Virtual Private Interface and associated system is deployed in the Cloud Exchange environment. The Direct Connect Virtual Private Interface and associated system's driving factors are the multiplicity of connectivity options that will be provided to customers.

The Direct Connect Virtual Private Interface may use the example code such as that recited in the priority provisional of the instant application for the switched virtual circuit (SVC) switch. The interface may use example code such as that similarly recited in the priority provisional shown for the SVC router. Additional example coding may also be used to help create this interface. The interface essentially may create an additional layer for virtual routing.

In one embodiment, the software used to facilitate the protocol and algorithms associated with the process can be embodied onto a machine-readable medium. A non-transitory machine-readable medium includes any mechanism that provides (e.g., stores) information in a form readable by a machine (e.g., a computer). For example, a machine-readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. The information representing the apparatuses and/or methods stored on the machine-readable medium may be used in the process of creating the apparatuses and/or methods described herein. The software coding may be written in a software programming language such as C++, Java, or another software language.

Routing Instances Overview

You can create multiple instances of BGP, IS-IS, LDP, Multicast Source Discovery Protocol (MSDP), OSPF version 2 (usually referred to simply as OSPF), OSPF version 3 (OSPFv3), Protocol Independent Multicast (PIM), RIP, and static routes by including statements at the following hierarchy levels:

[edit routing-instances routing-instance-name protocols]
[edit logical-systems logical-system-name routing-instances routing-instance-name protocols]

You can also create multiple routing instances for separating routing tables, routing policies, and interfaces for individual DHCP wholesale subscribers (retailers) in a layer 3 wholesale network. For information about how to configure layer 3 wholesale network services, see the Junos OS Broadband Subscriber Management Solutions Guide.

A routing instance is a collection of routing tables, interfaces, and routing protocol parameters. The set of interfaces belongs to the routing tables, and the routing protocol parameters control the information in the routing tables.

The direct connect virtual private interface may be configured to assign each VPC of the public cloud provider's infrastructure with its own private virtual interface, secure virtual routing network, and its own route table within the direct connect virtual private interface in order to keep the data/communication traffic from each VPC separate. Therefore the traffic of each VPC is not comingled with all the traffic coming from the public cloud provider's infrastructure. Two or more virtual routers on the public cloud provider's infrastructure may be configured to distribute routes to each other enabling access to their VPCs.

The direct connect virtual private interface incorporates a number of components to provision each virtual circuit. The number of components may include a Cisco router and virtual routing forwarding (VRFs) to create a secure circuit between each virtual private cloud and the direct connect virtual private interface. The VRF allows multiple instances of a routing table to co-exist within the same router at the same time. This increases functionality by allowing network paths to be segmented without using multiple devices. Because traffic is automatically segregated, VRF also increases network security and can eliminate the need for encryption and authentication. The direct connect virtual private interface may also cooperate with each public cloud provider's infrastructure to allow each VPC to allow that VPC to scale its use of the pool of shared computing resources, perform at the VPC's desired level of performance, and have the security desired and compatible with that VPC. In an exemplary embodiment, the direct connection between VPC is established within the virtual circuits created within the direct connect virtual private interface rather than trying to establish a connection over the public internet.

You can configure eight types of routing instances: forwarding, Layer 2 control (MX Series routers only), Layer 2 virtual private network (VPN), nonforwarding, VPN routing and forwarding (VRF), virtual router, virtual private LAN service (VPLS), and virtual switch (MX Series routers only).

Each routing instance has a unique name and a corresponding IP unicast table. For example, if you configure a routing instance with the name my-instance, the corresponding IP unicast table is my-instance.inet.0. All routes for my-instance are installed into my-instance.inet.0. The default routing instance, master, refers to the main inet.0 routing table. The master routing instance is reserved and cannot be specified as a routing instance.

Multiple routing instances may be created for separating routing tables, routing policies, and interfaces for individual Dynamic Host Configuration Protocol (DHCP) wholesale subscribers (retailers) in a layer 3 wholesale network. Each routing instance may consist of sets of the following:

Routing tables
Interfaces that belong to these routing tables
Routing option configurations
Eight types of routing instances may be configured:
Forwarding—Use this routing instance type for filter-based forwarding applications. For this instance type, there is no one-to-one mapping between an interface and a routing instance. All interfaces belong to the default instance inet.0.
Layer2-control—(MX Series routers only) Use this routing instance type for RSTP or MSTP in customer edge interfaces of a VPLS routing instance. This instance type cannot be used if the customer edge interface is multihomed to two provider edge interfaces. If the customer edge interface is multihomed to two provider edge interfaces, use the default BPDU tunneling.
Layer 2 VPN—Use this routing instance type for Layer 2 virtual private network (VPN) implementations.
Nonforwarding—Use this routing instance type when a separation of routing table information is required. There is no corresponding forwarding table. All routes are installed into the default forwarding table. IS-IS instances are strictly nonforwarding instance types.
Virtual router—Similar to a VPN routing and forwarding instance type, but used for non-VPN-related applications. There are no virtual routing and forwarding (VRF) import, VRF export, VRF target, or route distinguisher requirements for this instance type.

Virtual switch—(MX Series routers only) Use the virtual switch instance type to isolate a LAN segment with its Spanning Tree Protocol (STP) instance and separates its VLAN identifier space. For more detail information about configuring a virtual switch, see the *Junos Layer 2 Configuration Guide* and the *Junos OS MX Series Ethernet Services Routers Solutions Guide*.

VPLS—Use the virtual private local-area network service (VPLS) routing instance type for point-to-multipoint LAN implementations between a set of sites in a VPN.

VRF—Use the VPN routing and forwarding routing (VRF) instance type for Layer 3 VPN implementations. This routing instance type has a VPN routing table as well as a corresponding VPN forwarding table. For this instance type, there is a one-to-one mapping between an interface and a routing instance. Each VRF instance corresponds with a forwarding table. Routes on an interface go into the corresponding forwarding table.

Global routing options and protocols may be configured for the master instance by including statements at the [edit protocols] and [edit routing-options] hierarchy levels. Routes are installed into the master routing instance inet.0 by default, unless a routing instance is specified.

Multiple instances of BGP, OSPF, and RIP are used for Layer 3 VPN implementation. The multiple instances of BGP, OSPF, and RIP keep routing information for different VPNs separate. The VRF instance advertises routes from the customer edge (CE) router to the provider edge (PE) router and advertises routes from the PE router to the CE router. Each VPN receives only routing information belonging to that VPN.

The direct connect virtual private interface is configured to use one or more public Interfaces that advertise via BGP additional network use in the public cloud providers infrastructure in addition to multiple organizations having their own VPC in the public cloud providers infrastructure. Both public interfaces and VPC may go through the one physical connection between the public cloud provider's infrastructure and the direct connect virtual private interface. The public virtual interface therefore enables access to a commercial web service for hosting computer applications, such as Amazon Elastic Compute Cloud (EC2) classic instances, and the public cloud provider's application programming interface (API) endpoints.

Forwarding instances are used to implement filter-based forwarding for Common Access Layer applications.

PIM instances are used to implement multicast over VPN applications.

Nonforwarding instances of IS-IS and OSPF can be used to separate a very large network into smaller administrative entities. Instead of configuring a large number of filters, nonforwarding instances can be used to filter routes, thereby instantiating policy. Nonforwarding instances can be used to reduce the amount of routing information advertised throughout all components of a network. Routing information associated with a particular instance can be announced where required, instead of being advertised to the whole network.

Figure 3:
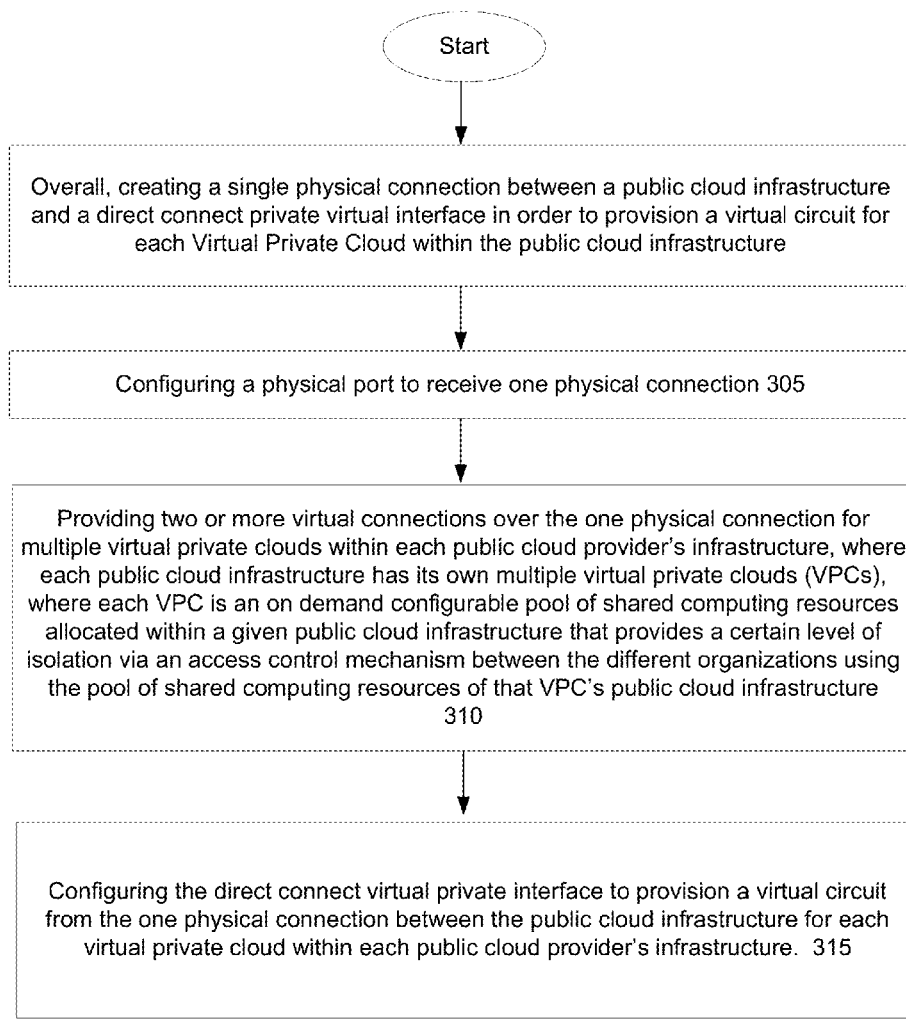
FIG. 3 illustrates an example method to create a single physical connection between a public cloud infrastructure and a direct connect private virtual interface in order to provision a virtual circuit for each Virtual Private Cloud within the public cloud infrastructure.

FIG. 3 illustrates an example method to create a single physical connection between a public cloud infrastructure and a direct connect private virtual interface in order to provision a virtual circuit for each Virtual Private Cloud within the public cloud infrastructure.

In step 305, a physical port is configured to receive one physical connection for each public cloud coupling into the direct connect private virtual interface.

In step 310, two or more virtual connections are provided over the one physical connection for multiple virtual private clouds within each public cloud provider's infrastructure. Each public cloud infrastructure has its own multiple virtual private clouds (VPCs). Each VPC is an on demand configurable pool of shared computing resources allocated within a given public cloud infrastructure that provides a certain level of isolation via an access control mechanism between the different organizations using the pool of shared computing resources of that VPC's public cloud infrastructure.

In step 315, the direct connect virtual private interface is configured to provision one or more virtual circuits from the one physical connection between the public cloud infrastructure to each virtual private cloud within each public cloud provider's infrastructure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These routines, algorithms, etc may be written in a number of different programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

In an embodiment, the logic consists of electronic circuits that follow the rules of Boolean Logic, software that contain patterns of instructions, or any combination of both.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

What is claimed is:

1. A direct connect virtual private interface comprising:
a physical port configured to receive one physical connection in order to provide respective virtual connections for multiple virtual private clouds within a public cloud provider infrastructure; and
at least one physical hardware router in communication with the public cloud provider infrastructure via the physical port,
where the virtual private clouds comprise respective on-demand configurable pools of shared computing resources allocated within the public cloud provider infrastructure that provide a level of isolation via access control mechanisms between respective organizations using the virtual private clouds,
where the direct connect virtual private interface is configured with private virtual interfaces to provide, for each virtual private cloud, a virtual connection between the virtual private cloud within the public cloud provider infrastructure and the at least one physical hardware router, and
where the at least one physical hardware router comprises respective virtual routers for the virtual private clouds, each virtual router configured to import respective routes for the virtual private clouds from the other virtual routers to enable the virtual private clouds to exchange traffic with one another over the private virtual interfaces via the at least one physical hardware router.

2. The direct connect virtual private interface of claim 1, wherein the direct connect virtual private interface has a plurality of physical ports for multiple public cloud provider infrastructures to physically connect to the direct connect virtual private interface as well as physical ports for two or more private Ethernet lines to connect to the direct connect virtual private interface.

3. The direct connect virtual private interface of claim 1,
wherein one or more telecommunications carriers connect to the direct connect virtual private interface, and
where the public cloud infrastructure has the organizations using the shared computing resources within the public cloud infrastructure, each organization with its own portion of the pool of shared computing resources forming a virtual private cloud for that organization, which is isolated from the other organizations using the shared computing resources within the public cloud infrastructure.

4. The direct connect virtual private interface of claim 1,
wherein each virtual private cloud has its own private virtual interface into the direct connect virtual private interface, and
wherein the virtual routers are set up or simulated by software running on the at least one physical hardware router that can be set up, taken down, moved around, and scaled up or down on-demand.

5. The direct connect virtual private interface of claim 1, wherein each virtual private cloud has its own private virtual interface into the direct connect virtual private interface, and wherein each organization having a virtual private cloud also has a client device resident within a multiple tenant datacenter, where the direct connect virtual private interface establishes the virtual connection between the virtual private cloud in the public cloud and the client device via the at least one physical hardware router.

6. The direct connect virtual private interface of claim 1, wherein the direct connect virtual private interface incorporates a number of components to provision the virtual connection, where the number of components includes the at least one physical hardware router configurable to implement virtual routing and forwarding (VRF) and one or more Service Access Switches configurable to establish a virtual local area networks (VLANs) to create virtual routing tunnels between each virtual private cloud and the direct connect virtual private interface.

7. The direct connect virtual private interface of claim 4, wherein the direct connect virtual private interface is configured to assign each virtual private cloud of the public cloud provider infrastructure a separate private virtual interface, a separate secure virtual routing network, and a separate route table within the direct connect virtual private interface in order to keep the traffic from each virtual private cloud separate rather than comingled with all the traffic received from the public cloud provider infrastructure.

8. The direct connect virtual private interface of claim 7, wherein the direct connect virtual private interface incorporates a number of components to implement each virtual connection, where the number of components includes the one or more physical hardware routers and virtual routing forwarding instances (VRFs) to create a secure circuit between each virtual private cloud and the direct connect virtual private interface, where VRFs allow multiple instances of a routing table to co-exist within the same router at the same time, where the direct connect virtual private interface cooperates with each public cloud provider infrastructure to allow each VPC to scale its use of the pool of shared computing resources, perform at the VPC's desired level of performance, and have the security desired and compatible with the VPC.

9. The direct connect virtual private interface of claim 1, wherein the virtual routers comprise respective route tables, each of the route tables storing one or more imported/exported routes from other route tables to allow connectivity/communication for the traffic within each virtual private cloud in this one to many connection set up established through the direct connect virtual private interface, and wherein the virtual routers handle inter virtual private cloud communication as well as external exchange of communication of traffic between the multiple virtual private clouds using the route tables.

10. The direct connect virtual private interface of claim 1, further comprising:
an additional router configured to:
handle control communications between each local network of an organization using one of the virtual private cloud and the organization's telecommunications carrier connecting to the direct connect virtual private interface; and
enable and control access between all of the organization's local networks in various public cloud provider infrastructures.

11. The direct connect virtual private interface of claim 1, wherein the virtual routers act as independent entities and the direct connect virtual private interface is configured to allow for overlapping network VLANs between public cloud providers, organizations, and telecommunications carriers.

12. The direct connect virtual private interface of claim 1, wherein the isolation between one organization using a first virtual private cloud of the virtual private clouds and all other organizations using virtual private clouds of the virtual private clouds is achieved through allocation of a private IP subnet and a virtual communication construct per organization.

13. The direct connect virtual private interface of claim 1, wherein, for cloud infrastructure services (SaaS), the public cloud provider providing the public cloud infrastructure and the company realizing the virtual private cloud service over the public cloud provider infrastructure are different.

14. The direct connect virtual private interface of claim 1, wherein the direct connect virtual private interface is configured to require only one physical connection to the physical port to connect with the public cloud provider infrastructure in order to create multiple virtual connections with corresponding virtual private interfaces in the direct connect virtual private interface in order to deliver services to the organizations having respective virtual private clouds within the public cloud provider infrastructure.

15. The direct connect virtual private interface of claim 1, wherein the direct connect virtual private interface is configured to use a switched virtual circuit to form a virtual connection, such that after a virtual connection is established between two nodes or application processes, a bit stream or byte stream may be delivered between the nodes, and
wherein a virtual connection protocol allows higher level protocols to avoid dealing with the division of data into segments, packets, or frames, where the switched virtual circuit is a temporary connection that is established and maintained only for the duration of a data transfer session.

16. The direct connect virtual private interface of claim 1, wherein each of the organizations uses a single physical connection to the public cloud provider infrastructure, where over the single physical connection to the public cloud provider infrastructure multiple service provider clients gain access only to their own virtual private cloud.

17. The direct connect virtual private interface of claim 16, wherein the public cloud provider infrastructure security setup is maintained because all virtualization is unique for each of the multiple service provider clients so that traffic from different multiple service provider clients is not commingled.

18. The direct connect virtual private interface of claim 1, where the direct connect virtual private interface is configured to use one or more public interfaces that advertise via Border Gateway Protocol additional network use in the public cloud provider infrastructure in addition to the organizations each having their own virtual private cloud in the public cloud provider infrastructure,
wherein both the private interfaces and one or more public interfaces traverse the one physical connection between the public cloud provider infrastructure and the direct connect virtual private interface, where the public virtual interface enables access to a commercial web service for hosting computer applications.

19. A method comprising:
configuring a physical port of a direct connect private virtual interface to receive one physical connection with a public cloud infrastructure;
connections over the one physical connection for multiple virtual private clouds within the public cloud provider infrastructure,
where the virtual private clouds comprise respective on-demand configurable pools of shared computing resources allocated within the public cloud provider infrastructure that provide a level of isolation via access control mechanisms between respective organizations using the virtual private clouds; and
configuring the direct connect virtual private interface with private virtual interfaces to provide, for each virtual private cloud, a virtual connection between the virtual private cloud within the public cloud provider infrastructure and at least one physical hardware router in communication with the public cloud provider infrastructure via the physical port; and
configuring the at least one physical hardware router with respective virtual routers for the virtual private clouds, each virtual router configured to import respective routes for the virtual private clouds from the other virtual routers to enable the virtual private clouds to exchange traffic with one another over the private virtual interfaces via the at least one physical hardware router.

20. A physical hardware router comprising:
a physical port configured to receive one physical connection to provide respective virtual connections for multiple virtual private clouds within a public cloud provider infrastructure, wherein the physical port is configured to exchange data communication with the public cloud provider infrastructure,
where each of the virtual private clouds comprises an on-demand configurable pool of shared computing resources allocated within the public cloud provider infrastructure that provide isolation via access control mechanisms between respective organizations using the virtual private clouds;
a plurality of private virtual interfaces, each of the private virtual interfaces configured to provide a separate virtual connection between a corresponding virtual private cloud within the public cloud provider infrastructure and the physical hardware router via the physical port; and
a plurality of virtual routers, each of the virtual routers configured to import respective routes for the virtual private clouds from the other virtual routers and to switch traffic among the virtual private clouds to enable the virtual private clouds to exchange traffic with one another over the private virtual interfaces via the physical hardware router.

* * * * *

UNITED STATES PATENT AND TRADEMARK OFFICE
CERTIFICATE OF CORRECTION

PATENT NO. : 9,584,445 B2
APPLICATION NO. : 14/270667
DATED : February 28, 2017
INVENTOR(S) : Andre Stubberfield, Fabrice Albert and Sougata Maitra It is certified that error appears in the above-identified patent and that said Letters Patent is hereby corrected as shown below:

In the Claims

Column 14, Line 5 (Claim 19): Replace "connections over the one physical connection for multiple" with --configuring virtual connections over the one physical connection for multiple--

Signed and Sealed this
Seventh Day of August, 2018

Andrei Iancu
*Director of the United States Patent and Trademark Office*